US012095869B2

(12) United States Patent
Fu et al.

(10) Patent No.: US 12,095,869 B2
(45) Date of Patent: Sep. 17, 2024

(54) CONNECTION PROCESSING METHOD AND APPARATUS, ELECTRONIC DEVICE, AND COMPUTER-READABLE STORAGE MEDIUM

(71) Applicant: BEIJING BYTEDANCE NETWORK TECHNOLOGY CO., LTD., Beijing (CN)

(72) Inventors: Di Fu, Beijing (CN); Jingui Wang, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 0 days.

(21) Appl. No.: 18/249,684

(22) PCT Filed: Sep. 18, 2021

(86) PCT No.: PCT/CN2021/119442
§ 371 (c)(1),
(2) Date: Apr. 19, 2023

(87) PCT Pub. No.: WO2022/083379
PCT Pub. Date: Apr. 28, 2022

(65) Prior Publication Data
US 2023/0388385 A1    Nov. 30, 2023

(30) Foreign Application Priority Data
Oct. 19, 2020   (CN) .......................... 202011116817.7

(51) Int. Cl.
*H04L 67/141*   (2022.01)
*H04L 67/131*   (2022.01)

(52) U.S. Cl.
CPC .......... *H04L 67/141* (2013.01); *H04L 67/131* (2022.05)

(58) Field of Classification Search
CPC ............... H04L 12/1822; H04L 65/403; H04L 12/2818; H04L 12/2825; H04M 3/567; G08B 13/19684; H04N 21/41407
See application file for complete search history.

(56) References Cited

U.S. PATENT DOCUMENTS

2002/0161896 A1\* 10/2002 Wen ................. H04L 67/14
709/227
2008/0133970 A1   6/2008 Son et al.
(Continued)

FOREIGN PATENT DOCUMENTS

CN    107342978 A    11/2017
CN    107743250 A    2/2018
(Continued)

OTHER PUBLICATIONS

Search Report mailed Dec. 6, 2021 in PCT/CN2021/119442, English Translation (5 pages).
(Continued)

*Primary Examiner* — Chirag R Patel

(57) ABSTRACT

Embodiments of the present disclosure provide a connection processing method and apparatus, an electronic device, and a computer-readable storage medium. The connection processing method includes: initializing, in response to receiving a first connection request from a source device, an abnormality processing policy; transmitting first connection information to a target device of the first connection request; transmitting, in response to receiving a first connection information confirmation message transmitted by the target device, a first connection confirmation message to the source device; generating the abnormality processing policy; transmitting a first notification to the target device, the first notification including the abnormality processing policy; and transmitting a second notification to the source device, the second notification including the abnormality processing policy.

20 Claims, 10 Drawing Sheets

(56) References Cited

U.S. PATENT DOCUMENTS

| | | | | |
|---|---|---|---|---|
| 2011/0010590 | A1* | 1/2011 | Varadarajan | G06Q 10/06 709/224 |
| 2013/0166703 | A1 | 6/2013 | Hammer et al. | |
| 2014/0025833 | A1 | 1/2014 | Kiessling | |
| 2014/0115587 | A1* | 4/2014 | Qin | H04L 41/0672 718/1 |
| 2019/0082058 | A1* | 3/2019 | Aoki | H04N 1/32406 |
| 2020/0067992 | A1* | 2/2020 | Terayama | H04L 65/1073 |
| 2021/0281986 | A1* | 9/2021 | Zhu | H04L 63/1425 |

FOREIGN PATENT DOCUMENTS

| | | |
|---|---|---|
| CN | 109815052 A | 5/2019 |
| CN | 109818994 A | 5/2019 |
| CN | 110324655 A | 10/2019 |
| CN | 110830460 A | 2/2020 |
| CN | 110971922 A | 4/2020 |
| CN | 111372092 A | 7/2020 |
| CN | 111584059 A | 8/2020 |
| CN | 112291316 A | 1/2021 |
| EP | 2346212 A1 | 7/2011 |
| WO | 2015/061374 A1 | 4/2015 |
| WO | 2015091785 A1 | 6/2015 |
| WO | 2020164632 A1 | 8/2020 |

OTHER PUBLICATIONS

Grant Notice mailed Jan. 30, 2022 in CN Appl. No. 202011116817.7, English Translation (9 pages).

Zhou Xudong, "Research on the Communication between CNC System of Machine Tool and PC for Adaptive Machining," Nanjing University of Aeronautics and Astronautics, The Graduate School College of Mechanical and Electrical Engineering, Mar. 2019, with English Abstract (83 pages).

Wang Yukuo et al., "Workflow Exception Handling Method Based on ECA Rules and Advanced Transaction Characteristics," 2010 International Forum on Information Technology and Applications, 2010, pp. 224-226 (3 pages).

European Search Report for EP Patent Application No. 21881798.9, Issued on Jan. 30, 2024, 11 pages.

* cited by examiner

CONNECTION PROCESSING METHOD AND APPARATUS, ELECTRONIC DEVICE, AND COMPUTER-READABLE STORAGE MEDIUM

CROSS-REFERENCE TO RELATED APPLICATION

This application claims priorities to Chinese Patent Application No. 202011116817.7, filed on Oct. 19, 2020 and entitled "CONNECTION PROCESSING METHOD AND APPARATUS, ELECTRONIC DEVICE, AND COMPUTER-READABLE STORAGE MEDIUM", the entire disclosure of which is incorporated herein by reference.

FIELD

The present disclosure relates to the field of connection processing, and more particularly, to a connection processing method and apparatus, an electronic device, and a computer-readable storage medium.

BACKGROUND

With a rapid development of information technology, mobile Internet technology also advance rapidly. The electronic devices have made remarkable breakthroughs with an emergence of a smart device or an arrival of a 5G era, or an application of other technologies like big data, AI intelligence, and algorithms. In real life, thanks to these technologies, social interaction is verified. Especially, the smart phone, with its emergence, breaks a space-time limit of daily contact of human beings, belonging to a comprehensive handheld mobile device integrated with massive information, network audio-visuality and leisure and entertainment, etc., thereby meeting people's daily information requirements and social interaction. At present, many platforms provide a live broadcast service. The number of people in one live broadcast room may be from several people to tens of thousands of people, with extremely high interaction frequency of audiences. In a live broadcast interaction scenario, people's connection interaction is based on that the interacting persons are in one room. For example, the interaction between an anchor and audiences is based on that the audiences are in an anchor room. The connection interaction between anchors is based on that the anchors are in one Real-Time Communication (RTC) room. Battle game of an anchor and the audiences as a group and a non-connected screen play killing (PK) between the anchor and the audiences are based on that the interacting persons are in one virtual room. In many service scenarios, from a perspective of a center station server, it is not simply entering into the virtual room to join one room, but a series of connection establishment processes. In each scenario requiring connection establishment and interaction of multiple persons, it is necessary to implement such a connection process and to consider abnormality processing in the connection establishment process, which is irrelevant to a service but troublesome and must be addressed. Therefore, a universal connection service and an abnormality processing solution are required.

SUMMARY

This part of the present disclosure is provided to briefly introduce concepts. These concepts will be described in detail in the following detailed implementations. This part of the present disclosure is neither intended to identify key or essential features of technical solutions to be claimed, nor intended to be used for limiting the scope of the technical solutions to be claimed.

In a first aspect, the embodiments of the present disclosure provide a connection processing method. The method includes: initializing, in response to receiving a first connection request from a source device, an abnormality processing policy; transmitting first connection information to a target device of the first connection request; transmitting, in response to receiving a first connection information confirmation message transmitted by the target device, a first connection confirmation message to the source device; generating the abnormality processing policy based on information of the source device and/or information of the target device; transmitting, in response to receiving a second connection confirmation message indicating that the source device is connected to a first server, a first notification to the target device, the first notification comprising the abnormality processing policy; and transmitting, in response to receiving a third connection confirmation message indicating that the target device is connected to a first server, a second notification to the source device, the second notification comprising the abnormality processing policy.

In a second aspect, the embodiments of the present disclosure provide a connection processing method. The method includes: transmitting a first connection request to a second server, the first connection request being used to request a target device to connect to a first server; receiving a first connection confirmation message transmitted by the second server; receiving a second notification transmitted by the second server, the second notification being used to indicate that the target device is connected to the first server, wherein the second notification comprises an abnormality processing policy; starting a second timer based on the abnormality processing policy; in response to receiving a target device connection message transmitted by the first server prior to expiration of the second timer, stopping the second timer; and in response to failing to receive the target device connection message transmitted by the first server prior to expiration of the second timer, performing a processing action based on the abnormality processing policy.

In a third aspect, the embodiments of the present disclosure provide a connection processing method. The method includes: receiving first connection information transmitted by a second server, the first connection information indicating a request from a source device for connecting a target device to a first server; transmitting a first connection confirmation message to the second server; receiving a first notification transmitted by the second server, the first notification indicating that the source device is connected to the first server, wherein the first notification comprises an abnormality processing policy; starting a third timer based on the abnormality processing policy; in response to receiving a source device connection message transmitted by the first server prior to expiration of the third timer, stopping the third timer; and in response to failing to receive the source device connection message transmitted by the first server prior to expiration of the third timer, performing a processing action based on the abnormality processing policy.

In a fourth aspect, the embodiments of the present disclosure provide an electronic device. The electronic device includes at least one processor and a memory communicatively connected to the at least one processor. The memory has instructions stored thereon and executable by the at least one processor. The instructions, when executed by the at least one processor, cause the at least one processor to implement the above-mentioned method according to any one of the first to third aspects.

In a fifth aspect, the embodiments of the present disclosure provide a non-transitory computer-readable storage medium. The non-transitory computer-readable storage medium stores computer instructions. The computer instructions are configured to cause the computer to implement the above-mentioned method according to any one of the first to third aspects.

The above description is merely an overview of the technical solutions of the present disclosure. In order to clearly understand technical means of the present disclosure, it can be implemented based on the content of the description. In order to make the above and other objects, features, and advantages of the present disclosure more comprehensible, the following detailed description will be described by listing good embodiments with reference to the accompanying drawings.

BRIEF DESCRIPTION OF THE DRAWINGS

The above and other features, advantages, and aspects of embodiments of the present disclosure will become more apparent in conjunction with the accompanying drawings and with reference to the following specific implementations. Throughout the accompanying drawings, same or similar elements are denoted by same or similar reference numerals. It should be understood that the accompanying drawings are illustrative, and components and elements are not necessarily illustrated to scale.

DETAILED DESCRIPTION

Figure 1:
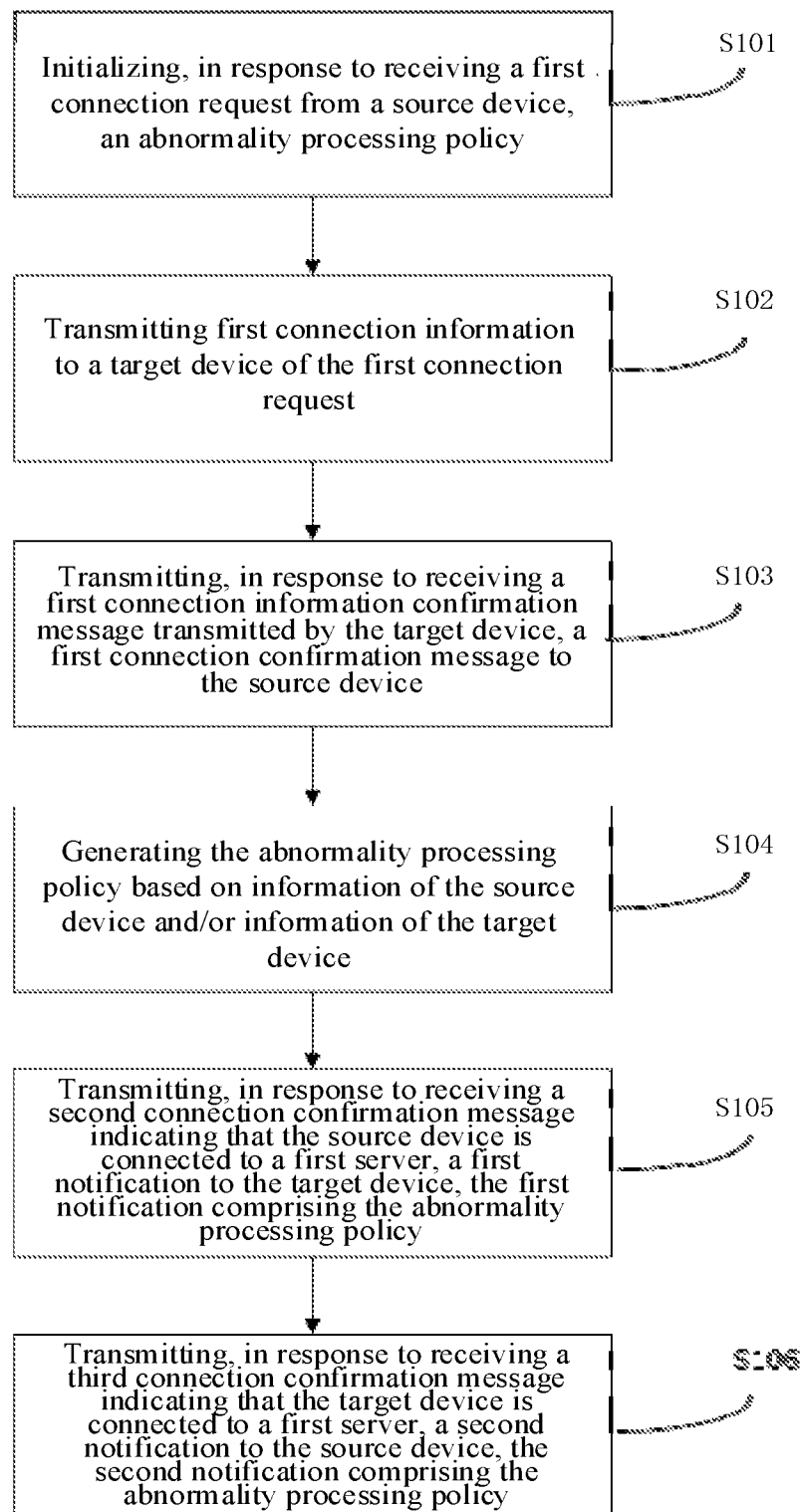
FIG. 1 is a flowchart of a connection processing method according to an embodiment of the present disclosure.

Embodiments of the present disclosure will be described in detail below with reference to the accompanying drawings. Although some embodiments of the present disclosure are illustrated in the drawings, it should be understood that the present disclosure may be implemented in various forms and should not be construed as being limited to the embodiments set forth herein. On the contrary, these embodiments are provided for a more complete and thorough understanding of the present disclosure. It should be understood that the accompanying drawings and embodiments of the present disclosure are merely illustrative, and are not intended to limit the scope of the present disclosure.

It should be understood that steps described in method implementations of the present disclosure may be performed in different sequences and/or in parallel. In addition, the method implementations may include additional steps and/or omit executions of the illustrated steps. The scope of the present disclosure is not limited in this regard.

The term "include" or "comprise" and its variants as used herein indicate open-ended inclusions, i.e., "includes but not limited to". The term "based on" refers to "at least partially based on". The term "one embodiment" means "at least one embodiment"; the term "another embodiment" means "at least one additional embodiment"; and the term "some embodiments" means "at least some embodiments". Associated definitions of other terms will be given in the following description.

It should be noted that concepts such as "first" and "second" mentioned in the present disclosure are only used to distinguish different apparatuses, modules, or units, and are not used to limit a sequence or interdependence of functions performed by these apparatuses, modules, or units.

It should be noted that the terms such as "a" and "plurality of" in the present disclosure are illustrative, rather than being restrictive, and should be construed as "one or more" by those skilled in the art, unless otherwise clearly indicated in the context.

Names of messages or information exchanged between apparatuses in the embodiments of the present disclosure are only used for illustrative purposes, and are not intended to limit the scope of these messages or information. In order to make the objects, technical solutions, and advantages of the embodiments of the present disclosure more apparent, the embodiments of the present disclosure will be described in detail below with reference to the accompanying drawings.

FIG. 1 is a flowchart of a connection processing method according to an embodiment of the present disclosure. The connection processing method provided in this embodiment may be implemented by one connection processing apparatus. The connection processing apparatus may be implemented as software or a combination of software and hardware. The connection processing apparatus may be integrated in a certain device of a connection processing system, such as in a connection processing server or in a connection processing terminal device. In this embodiment of the present disclosure, the connection processing method is implemented by a second server as an example for illustration. The second server is a connection server composed of one or more servers. The second server is typically composed of a service server and a platform server. A series of connection interaction actions may be performed in the second server. However, for a client, the second server may be regarded as a server, which is not described in detail herein.

As illustrated in FIG. 1, the method includes the following actions in blocks S101 to S106.

At block S101, in response to receiving a first connection request from a source device (a first device), an abnormality processing policy is initialized.

In an embodiment, the second server has a detection interface for detecting a request, a message, and the like of a client device. The source device is a service initiating device. For example, in a microphone connection-based application scenario of anchors, an anchor A initiates a microphone connection request to an anchor B. In this case, a client device A of the anchor A is the source device, and the microphone connection request is the first connection request. The first connection request is received by the second server. When the second server receives the first connection request, the second server first initializes the abnormality processing policy.

In an embodiment, block S101 includes actions in blocks S201 to S202.

At block S201, a type of a service is determined based on the first connection request.

At block S202, a corresponding abnormality processing policy structure is generated based on the type of the service. The abnormality processing policy structure includes at least a connection identification and a device identification graph. The device identification graph is used to store a device identification and an abnormality processing action.

In block S201, the type of the service is determined based on the first connection request. As illustrated in the above example, the first connection request is the microphone connection request, and thus the type of the service is determined to be a microphone connection. The server has a plurality of abnormality processing policies. Each abnormality processing policy corresponds to one or more types of service to adapt to abnormality processing in various service scenarios. For example, a typical type of service is the microphone connection, microphone connection with audiences, host conference, non-host conference, multi-player game, etc. Different information may be required for different services in the abnormality processing. Therefore, the different abnormality processing policies are required to be initialized based on the type of the service. In addition, the client device has its roles in each type of service, and different roles have different processing policies based on different requirements of these roles. The processing policies may be pre-configured or learned based on historical processing data, which is not limited herein.

In block S202, the corresponding abnormality processing policy structure is generated based on the type of the service. As mentioned above, information required by the different types of service may be different. Therefore, an abnormality processing policy structure needs to be generated based on a form of the type of the service. The structure includes an information item required by the abnormality processing policy. For example, in a microphone connection scenario, a room number of a microphone connection virtual room and an identification of a client device in the virtual room, i.e., the connection identification and the device identification graph in block S202, are required. Once the first connection request is just received, only the type of the service may be obtained, and the connection identification and the device identification may not exist, such that only the abnormality processing policy structure is generated in this block. In this way, the structure can be filled after corresponding information is subsequently received, to generate a usable abnormality processing policy.

At block S102, first connection information is transmitted to a target device (a second device) of the connection request.

Since the source device is not in a direct communication with the target device, the second server needs to generate the first connection information and transmit the first connection information to the target device (for example, a client device B of the anchor B in the above example) of the first connection request, to notify the target device that the source device requests the target device to join a connection.

In the above example, the client device A transmits a microphone connection invitation to the second server; the second server transmits invitation information to the client device B; the client device B, after receiving the invitation information, displays a prompt interface in a display apparatus to remind the anchor B to accept the microphone connection request. When the anchor B accepts the microphone connection request, a subsequent connection operation continues.

At block S103, in response to receiving a first connection information confirmation message transmitted by the target device, a first connection confirmation message is transmitted to the source device.

When the target device accepts the first connection information, i.e., agreeing with the first connection request, the first connection information confirmation message is transmitted to the second server, to indicate that the first connection request is accepted by the target device. In this case, the second server transmits the first connection confirmation message to the source device to inform the source device that a processing of the first connection request is completed.

The actions in blocks S102 and S103 are merely a request and a confirmation for the request from a perspective of the client device. However, for the second server, the first connection request may be processed by using a universal connection establishment process regardless of requests of the type of the service. In an embodiment, the universal connection establishment process is implemented in the second server. In an embodiment, the second server further includes a service server and a platform server. The service server is at an upper layer of logic and is configured to receive the request, the message, and the like of the client device, to understand a service scenario, which is requested by the client device or in which the client device is located, thereby processing a request or message, etc. related to the service scenario. The platform server is at a bottom layer of the logic and is configured to implement a function of the service server at the bottom layer. The service server for receiving the first connection request can understand a service scenario of the first connection request. Then, the service server and the platform server implement the actions in blocks S102 and S103 through a connection process.

In some embodiments, after the first connection request is received by the service server, the service server generates a connection creation message linker_create and transmits the connection creation message linker_create to the platform server. After the linker_create is received by the platform server, the platform server transmits a confirmation to the service server. The service server then transmits a connection invitation message to the platform server. The platform server generates and transmits the first connection information to the target device, and then transmits the confirmation to the service server. In this case, the service server may further transmit receipt confirmation information of the first connection request to the source device. After the first connection information is received by the target device, the target device transmits feedback information reply to the service server. When the feedback information reply is received, the service server transmits feedback information linker reply to the platform server, indicating that the first connection request has been accepted by the target device. In this case, the platform server transmits the first connection confirmation message to the source device to notify the source device that the first connection request has been accepted by the target device. Therefore, the first connection request is processed through the universal connection establishment process. A request or message, etc. transmitted by the source device and the target device generates a bottom signaling through an analysis of the service server to perform an interaction with the platform server to implement the process of connection establishment. Therefore, any service may be converted into the universal connection establishment process through the service server and the platform server.

At block S104, the abnormality processing policy is generated based on information of the source device and/or information of the target device.

The information of the source device and/or the information of the target device are obtained through a connection request and a message, etc. of the source device and/or the target device. For example, the information of the source device may be obtained through the first connection request, and the information of the target device may be obtained through the first connection information confirmation message. It may be understood that any request and message from the source device and/or the target device to the second server may carry the information of the source device and/or the target device, enabling the second server to generate the abnormality processing policy based on the information.

In an embodiment, block S104 includes actions in blocks S301 to S304.

At block S301, a first processing action when the source device is abnormal is determined based on a role of the source device in the service;

At block S302, the device identification of the source device and the first processing action are saved in the corresponding abnormality processing policy structure; and/or At block S303, a second processing action when the target device is abnormal is determined based on a role of the target device in the service;

At block S304, the device identification of the target device and the second processing action are saved in the corresponding abnormality processing policy structure.

As illustrated in the above blocks, a request or message from the source device to the second server may carry service information, such as a type of a service requested by the source device, a role of the source device in the service, an identification of the source device, and the like. In the second server, an abnormality processing action of each service is predetermined, i.e., how to process when a certain role is abnormal. Therefore, when the source device is abnormal, the second server can determine the first processing action to be performed based on the role of the source device in the service. The first processing action is used for eliminating an influence caused by an abnormality of the source device. After the first processing action is determined, the identification of the source device and the first processing action, as a pair of data, are stored in the abnormality processing policy structure. For example, in the above device identification graph, each piece of data may be a KV data pair, where K is the identification of the device, and V is a processing action performed when the device is abnormal. The similar operations mentioned above are also performed on the target device. The device identification of the target device and the second processing action are saved in the corresponding abnormality processing policy structure. Therefore, whenever a new device is added to the service, the new device can be added to the abnormality processing policy structure through the method as described in the above blocks, to generate the abnormality processing policy.

In an embodiment, the source device and/or the target device may have a plurality of abnormalities. In this case, a plurality of abnormality types may be set for an identification of each device. A corresponding abnormality processing action is provided for each abnormality type, which will not be repeated herein.

At block S105, in response to receiving a second connection confirmation message indicating that the source device is connected to a first server, a first notification is transmitted to the target device. The first notification includes the abnormality processing policy.

The first server is a server configured to provide service data services to the source device and the target device, for example, an RTC server required in live broadcast and microphone connection scenarios. The RTC server is configured to provide real-time video and audio services for the live broadcast and microphone connection scenarios. A virtual room in the live broadcast and microphone connection scenarios is also established at the RTC server.

However, in some practical application scenarios, the first server has various and complex service interfaces, and the first server and the second server cannot be directly connected. Thus, the second server cannot directly determine whether the source device and/or the target device enter the service scenario thereof. Therefore, it is required that the source device and/or the target device shall determine on their own whether the other party enters the service scenario thereof. As in the above example, the client device A invites the client device B to join the microphone connection, after the client device B agrees, the client device B needs to determine whether the client device A enters the virtual room and to know which processing should be performed when the client device A does not enter the virtual room; the client device A needs to determine whether the client device B enters the virtual room and to know which processing should be performed when the client device B does not enter the virtual room.

The second connection confirmation message is a message transmitted by the source device to the second server. However, the second connection confirmation message does not indicate that the source device has been actually connected to the first server. The second connection confirmation message merely enables the second server to notify the target device that the source device has been connected to the first server. Therefore, the second server transmits the first notification to the target device and transmits the abnormality processing policy to the target device through the first notification. In an embodiment, the abnormality processing policy may be an abnormality processing policy only related to the source device. The target device, after receiving the abnormality processing policy, starts to detect a state of the source device through the first server, to determine whether the source device is indeed connected to the first server. When the source device is not actually connected to the first server, a processing action in the abnormality processing policy is performed.

At block S106, in response to receiving a third connection confirmation message indicating that the target device is connected to a first server, a second notification is transmitted to the source device. The second notification includes the abnormality processing policy.

Similar to block S105, the third connection confirmation message is a message transmitted by the target device to the second server. However, the third connection confirmation message does not indicate that the target device has been actually connected to the first server. The third connection confirmation message merely enables the second server to notify the source device that the target device has been connected to the first server. Therefore, the second server transmits the second notification to the source device and transmits the abnormality processing policy to the source device through the second notification. In an embodiment, the abnormality processing policy may be an abnormality processing policy only related to the target device. After the abnormality processing policy is received, the source device starts to detect a state of the target device through the first server to determine whether the target device is indeed connected to the first server. When the target device is not actually connected to the first server, the processing action in the abnormality processing policy is performed.

The above blocks S105 to S106 are further described with an example of a microphone connection application scenario. After the connection is established through the second server, the client device A and the client device B need to be respectively connected to the RTC server to enter a virtual room for the microphone connection. However, the RTC server and the second server cannot be directly connected. Therefore, the client device is required to detect the connection with the RTC server on its own. The client device A transmits the second connection confirmation message to the second server to indicate that the client device A has entered a microphone connection room. Based on the second connection confirmation message, the second server transmits the first notification to the client device B to notify the client device B that the client device A has entered the room. The first notification includes an abnormality processing policy of the client device A. Similarly, the client device B transmits the second connection confirmation message to the second server to indicate that the client device B has entered the microphone connection room. Based on the second connection confirmation message, the second server transmits the first notification to the client device A to notify the client device A that the client device B has entered the room. The first notification includes an abnormality processing policy of the client device B.

It should be noted that the transmission of the second connection confirmation message by source device and the connection of the source device to the first server have no timing relationship. The transmission of the third connection confirmation message by the target device and connection of the target device to the first server also have no timing relationship. When the device is connected to the first server, information of a device, which has been connected to the first server before this device, may be obtained, and this device may also transmit the information of this device to the device that has been previously connected to the first server. Therefore, no matter when the device is connected to the first server, it can be determined whether a device detected by the device is connected to the first server.

Through the above actions in blocks S101 to S106, the abnormality processing policy is generated, and the abnormality processing policy is transmitted to a corresponding device. Therefore, the corresponding device can detect abnormalities of other devices and perform corresponding processing.

The second server may further detect the state of the source device and/or the state of the target device to determine whether to perform abnormality processing on the source device and/or the target device. In an embodiment, the connection processing method further includes: periodically checking a state of the source device and/or a state of the target device; and processing, when the state of the source device and/or the state of the target device are abnormal, a device in an abnormal state based on the abnormality processing policy.

The steps of said periodical checking may be implemented through an independent script, i.e., running an independent script on the second server, to detect a running state of the source device and/the target device in the service scenario.

In an embodiment, said periodically checking the state of the source device and/or the state of the target device includes: starting a first timer; in response to receiving state information of the source device and/or the target device prior to expiration of the first timer, resetting the first timer; and in response to failing to receive the state information of the source device and/or the target device prior to expiration of the first timer, determining that the state of the source device and/or the state of the target device are abnormal.

For example, when the source device and the target device operate in the microphone connection scenario, the source device and the target device periodically transmit the state information to the second server, to notify the second server that the states of their own are normal. For example, the state information is a heartbeat. Therefore, the second server starts the first timer. A time-out period of the first timer is equal to a period of transmitting the state information of the source device and the target device. When the state information of the source device and/or the state information of the target device are received before the first timer expires, it indicates that the state of the source device and/or the state of the target device are normal, and the first timer is reset to start timing again. When the state information of the source device and/or the state information of the target device are not received before the first timer expires, it is determined that the state of the source device and/or the state of the target device are abnormal.

When it is determined that the state of the source device and/or the state of the target device are abnormal, a processing action of the device in the abnormal state is determined from the abnormality processing policy based on the identification of the source device and/or the identification of the target device, to process the device in the abnormal state. For example, when a heartbeat of the target device is not received before the first timer expires, it is considered that the target device is abnormal, thereby performing a departure processing on the target device.

Further, after said processing the device in the abnormal state based on the abnormality processing policy, the connection processing method further incudes: deleting the device in the abnormal state from the abnormality processing policy.

In this step, the device in the abnormal state has left the service scenario, then the state of the device no longer needs to be detected subsequently. In this case, the device identification of the device in the abnormal state and a corresponding processing action are deleted from the abnormality processing policy, to reduce a volume of the abnormality processing policy.

Figure 4:
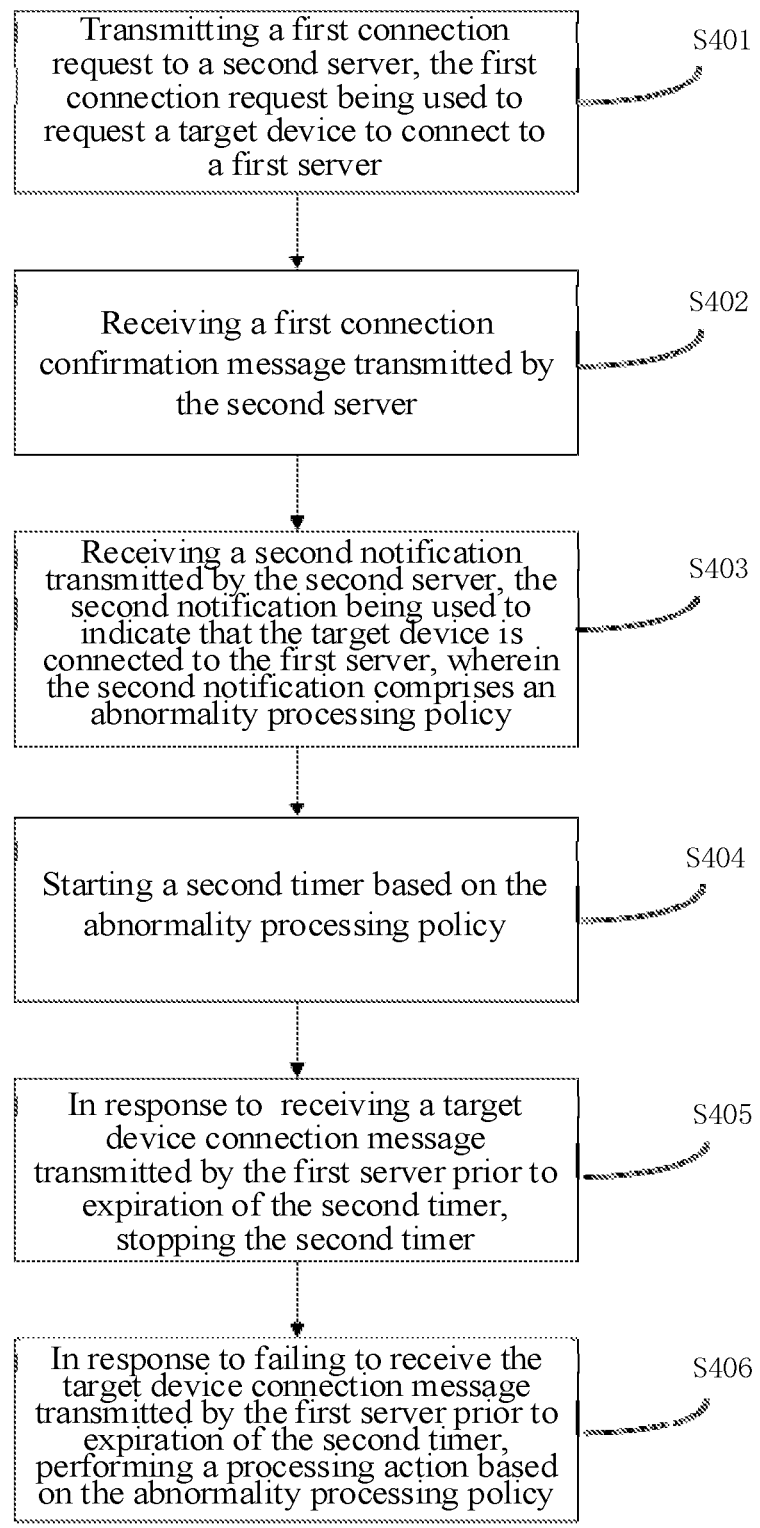
FIG. 4 is a flowchart of a connection processing method according to another embodiment of the present disclosure.

FIG. 4 is a flowchart of a connection processing method according to another embodiment of the present disclosure. The connection processing method provided in this embodiment may be implemented by one connection processing apparatus. The connection processing apparatus may be implemented as the software or the combination of software and hardware. The connection processing apparatus may be integrated in the certain device of the connection processing system, such as in the connection processing server or in the connection processing terminal device. In this embodiment of the present disclosure, the connection processing method is implemented by the source device as an example for illustration.

As illustrated in FIG. 4, the method includes the following actions in blocks S401 to S406.

At block S401, a first connection request is transmitted to a second server. The first connection request is used to request a target device to connect to a first server.

At block S402, a first connection confirmation message transmitted by the second server is received.

At block S403, a second notification transmitted by the second server is received. The second notification is used to indicate that the target device is connected to the first server. The second notification includes an abnormality processing policy.

At block S404, a second timer is started based on the abnormality processing policy.

At block S405, in response to receiving a target device connection message transmitted by the first server prior to expiration of the second timer, the second timer is stopped.

At block S406, in response to failing to receive the target device connection message transmitted by the first server prior to expiration of the second timer, a processing action is performed based on the abnormality processing policy.

Blocks S401 to S403 correspond to block S101, block S103, and block S106 in the above embodiments. That is, the source device transmits the first connection request to the second server, to request the target device to connect to the first server, enabling the target device to perform service interaction with the source device. Then, after the target device agrees to connect, the first connection confirmation message from the second server is received. When receiving the second notification, it is known that the target device has been connected to the first server and an abnormality processing policy of the target device is obtained.

Then, through blocks S404 to S406, the source device detects whether the target device is indeed connected to the first server. In an optional embodiment, the abnormality processing policy includes the time-out period. Then, at block S404, the second timer is started based on a predetermined time-out period in the abnormality processing policy. In another optional embodiment, a predetermined time-out period is provided for each service role. The second timer is started based on a time-out period of a role of the target device recorded in the abnormality processing policy. At block S405 and block S406, it is determined whether the target device connection message transmitted by the first server is received before the second timer expires. If the target device connection message transmitted by the first server is received before the second timer expires, it indicates that the target device is indeed connected to the first server, then the second timer is stopped. If the target device connection message transmitted by the first server is not received before the second timer expires, it indicates that the target device is actually not connected to the first server within a specified time, then the abnormality processing is required to be performed on the target device, and a corresponding processing action is performed based on the abnormality processing policy, for example, performing the departure processing on the target device. In this way, the second server can be informed that the target device is actually not connected. Further, the second server deletes the connection of the target device and deletes the target device from the abnormality processing policy.

Further, the connection processing further includes: transmitting a second connection confirmation message to the second server, and transmitting a second connection request to the first server.

In an embodiment, after the first connection confirmation message transmitted by the second server is received, the source device may transmit the first connection confirmation message to the second server to indicate that the source device has been connected to the first server, and the source device transmits the second connection request to the first server. For example, in the microphone connection scenario, the client device A transmits the connection request to the RTC server, in order to enter the virtual room.

Further, the connection processing further includes: periodically transmitting the state information of the source device to the second server.

That is, the source device periodically transmits heartbeat information to the second server to report its own state. When no heartbeat information is received within the specified time, the second server confirms that the state of the source device is abnormal.

Figure 5:
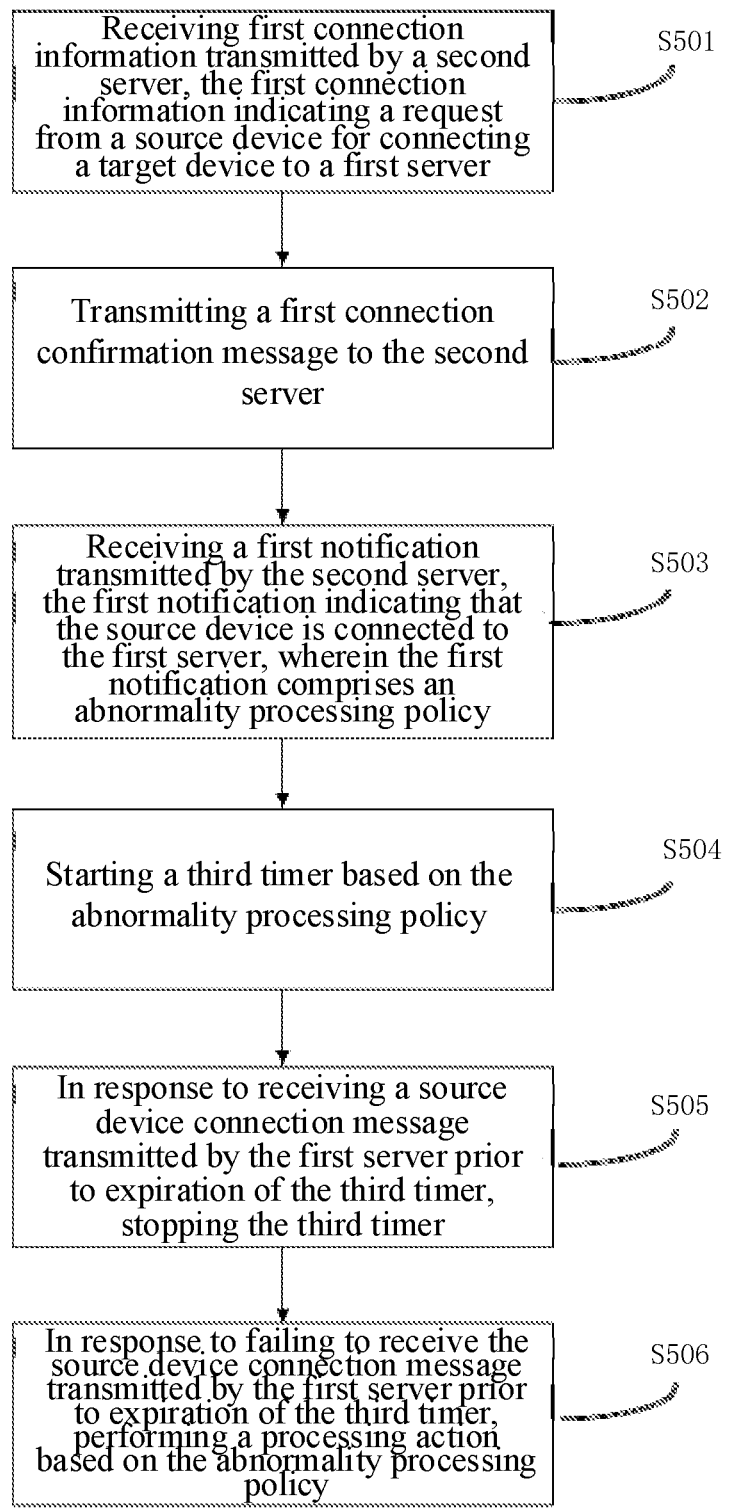
FIG. 5 is a flowchart of a connection processing method according to yet another embodiment of the present disclosure.

FIG. 5 is a flowchart of a connection processing method according to yet another embodiment of the present disclosure. The connection processing method provided in this embodiment may be implemented by one connection processing apparatus. The connection processing apparatus may be implemented as the software or the combination of software and hardware. The connection processing apparatus may be integrated in the certain device of the connection processing system, such as in the connection processing server or in the connection processing terminal device. In this embodiment of the present disclosure, the connection processing method is implemented by the source device as an example for illustration.

As illustrated in FIG. 5, the method includes the following actions in blocks S501 to S506.

At block S501, first connection information transmitted by a second server is received. The first connection information indicates a request from a source device for connecting a target device to a first server.

At block S502, a first connection confirmation message is transmitted to the second server.

At block S503, a first notification transmitted by the second server is received. The first notification indicates that the source device is connected to the first server. The first notification includes an abnormality processing policy.

At block S504, a third timer is started based on the abnormality processing policy.

At block S505, in response to receiving a source device connection message transmitted by the first server prior to expiration of the third timer, the third timer is stopped.

At block S506, in response to failing to receive the source device connection message transmitted by the first server prior to expiration of the third timer, a processing action is performed based on the abnormality processing policy.

Actions in blocks S501 to S503 correspond to actions in block S102, block S103, and block S105 in the above embodiments. That is, the target device receives the first connection information transmitted by the second server, and transmits the first connection confirmation information to the second server after the connection is permitted. Then, the first notification is received to indicate that the source device has been connected to the first server, and an abnormality processing policy of the source device is obtained.

Then, through blocks S504 to S506, the target device detects whether the source device is indeed connected to the first server. In an optional embodiment, the abnormality processing policy includes the time-out period. Thus, at block S504, the third timer is started based on the predetermined time-out period in the abnormality processing policy. In another optional embodiment, a predetermined time-out period is provided for each service role. The third timer is started based on the time-out period of the role of the target device recorded in the abnormality processing policy. At block S505 and block S506, it is determined whether the source device connection message transmitted by the first server is received before the third timer expires. If the source device connection message transmitted by the first server is received before the third timer expires, it indicates that the source device is indeed connected to the first server, then the third timer is stopped. If the source device connection message transmitted by the first server is not received before the third timer expires, it indicates that the source device is actually not connected to the first server within the specified time, then the abnormality processing is required to be performed on the source device, and the corresponding processing action is performed based on the abnormality processing policy, for example, performing the departure processing on the source device. In this way, the second server can be informed that the source device is actually not connected. Further, the second server deletes the connection of the source device and deletes the source device from the abnormality processing policy. In some scenarios, the source device plays a role that must exist in the service, such as a host. When the source device is not successfully connected, the entire service needs to be deleted. In this case, when the source device is not successfully connected, based on the abnormality processing policy, in addition to deleting the device, the abnormality processing policy and the connection related to this service also need to be deleted, which is not described in detail herein.

Further, the connection processing further includes: transmitting a third connection confirmation message to the second server, and transmitting a third connection request to the first server.

In an embodiment, after the first connection confirmation message transmitted by the second server is received, the target device may transmit the third connection confirmation message to the second server to indicate that the target device has been connected to the first server, and the target device transmits the third connection request to the first server. For example, in the microphone connection scenario, the client device B transmits the connection request to the RTC server, in order to enter the virtual room.

Further, the connection processing further includes: periodically transmitting the state information of the target device to the second server.

That is, the target device periodically transmits the heartbeat information to the second server to report its own state. When no heartbeat information is received within the specified time, the second server confirms that the state of the target device is abnormal.

By means of the connection processing method in the above three embodiments, the server may establish connection requests of various services in the process through a universal connection and process an abnormal situation in the connection process.

Figure 6:
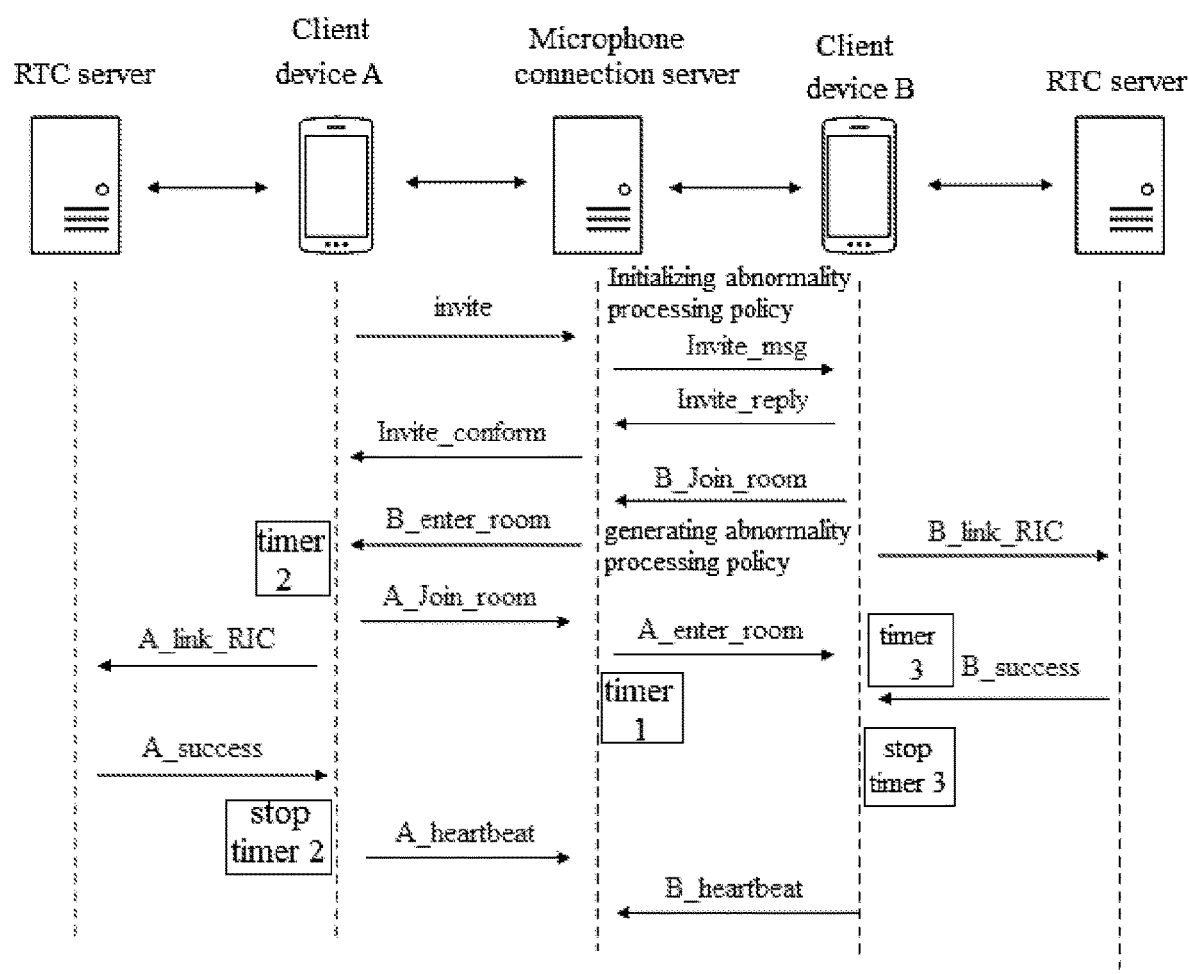
FIG. 6 is a schematic diagram of an application scenario of a connection processing method according to an embodiment of the present disclosure.

FIG. 6 is a schematic diagram of an application scenario of a connection processing method according to an embodiment of the present disclosure. As illustrated in FIG. 6, in the microphone connection application scenario, the client device A is the source device; the client device B is the target device; a microphone connection server is the second server; and the RTC server is the first server. The client device A transmits a microphone connection request Invite to invite the client device B to perform a microphone connection interaction. The microphone connection server, after receiving the Invite, initializes the abnormality processing policy and transmits the Invite_msg to the client device B. The client device B accepts the microphone connection request and generates a feedback message Invite_reply of the microphone connection request for the microphone connection server. The microphone connection server transmits a confirmation message Invite_conform of the microphone connection request to the client device A. The client device B, after transmitting the Invite_reply, directly transmits B_Join_room to the microphone connection server and transmits Blink RTC to connect the RTC server. The microphone connection server, after receiving the B_Join_room, generates the abnormality processing policy, and transmits B_enter_room to the client device A to inform the client device A that the client device B has entered the microphone connection room. The B_enter_room carries the abnormality processing policy of the client device B. The client device A, after receiving the B_enter_room, starts the timer 2, transmits A_Join_room to the microphone connection server, and transmits A_link RTC to connect the RTC server. The microphone connection server, after receiving the A_Join_room, transmits A_enter_room to the client device B to inform the client device B that the client device A has entered the microphone connection room. The A_enter_room carries the abnormality processing policy of the client device A. The client device A, after receiving the A_enter_room, starts the timer 3. In this example, the client device B is first successfully connected to the RTC server, and then the client device A is successfully connected to the RTC service. Therefore, when the client device A is connected to the RTC server, the client device B is capable of knowing that the client device A is successfully connected, and then the client device B stops the timer 3. In addition, when the client device A is successfully connected, the client device B has been successfully connected, such that the client device A can obtain the client device that has been successfully connected and can find that the client device B is included in the client device that has been successfully connected. Then, the client device A stops the timer 2. In a microphone connection process, the client device A periodically transmits A_heartbeat to the microphone connection server, and the client device B periodically transmits B_heartbeat to the microphone connection server. The microphone connection server operates independently. The timer 1 is started to regularly detect whether A_heartbeat and B_heartbeat are received. In the microphone connection establishment process and the microphone connection process, when the client device is abnormal, a processing action corresponding to the abnormality processing policy is performed.

Embodiments of the present disclosure disclose a connection processing method and apparatus, an electronic device, and a computer-readable storage medium. The connection processing method includes: initializing, in response to receiving a first connection request from a source device, an abnormality processing policy; transmitting first connection information to a target device of the first connection request; transmitting, in response to receiving a first connection information confirmation message transmitted by the target device, a first connection confirmation message to the source device; generating the abnormality processing policy based on information of the source device and/or information of the target device; transmitting, in response to receiving a second connection confirmation message indicating that the source device is connected to a first server, a first notification to the target device, the first notification comprising the abnormality processing policy; and transmitting, in response to receiving a third connection confirmation message indicating that the target device is connected to a first server, a second notification to the source device, the second notification comprising the abnormality processing policy. The above-mentioned method can solve the complex problems of connection establishment and abnormality processing of various services by generating the abnormality processing policy in the process of connection establishment.

In the above description, although the respective steps of the above method embodiments are described in the above-mentioned order, those skilled in the art can understand that these steps in the embodiments of the present disclosure are not necessarily performed in the above-mentioned order, and they may also be performed in other orders such as sequentially, parallelly, alternately, etc. Based on the above steps, a person skilled in the art may also add other steps. These obvious modifications or equivalent replacement should shall be included in the protection scope of the present disclosure, which are not described in detail herein.

Figure 7:
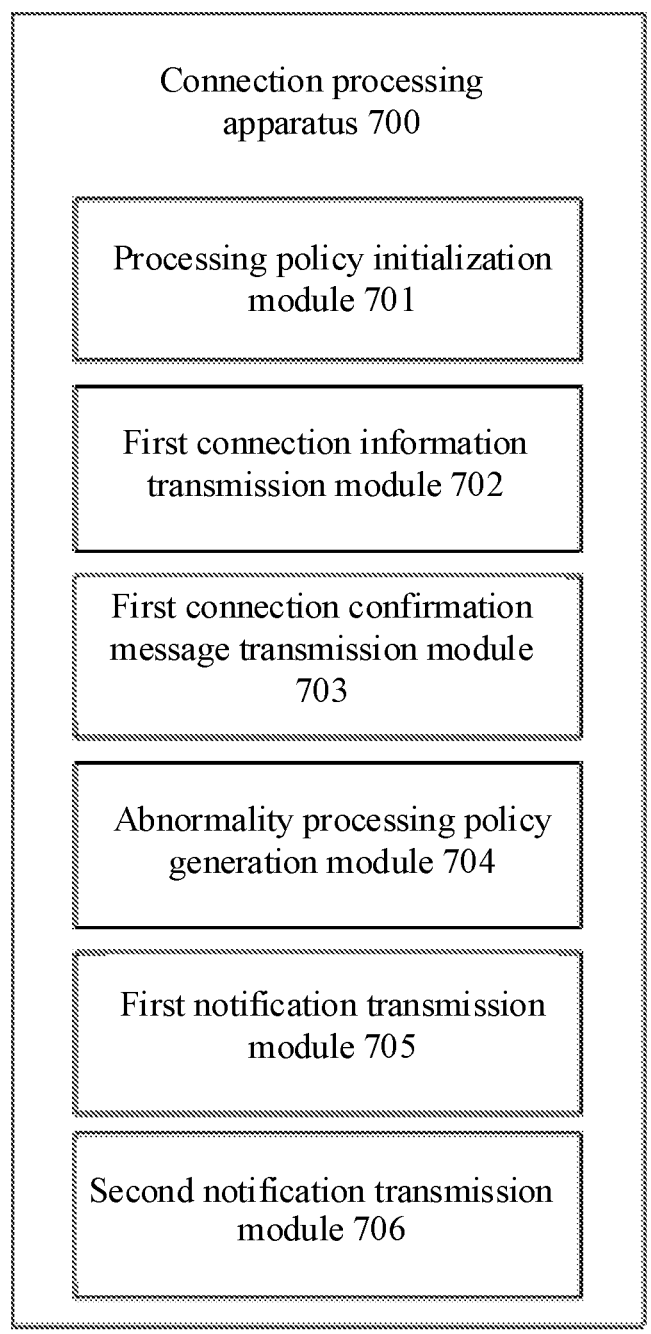
FIG. 7 is a schematic structural diagram of a connection processing apparatus according to an embodiment of the present disclosure.

FIG. 7 is a schematic structural diagram of a connection processing apparatus according to an embodiment of the present disclosure. As illustrated in FIG. 7, the apparatus 700 includes a processing policy initialization module 701, a first connection information transmission module 702, a first connection confirmation message transmission module 703, an abnormality processing policy generation module 704, a first notification transmission module 705, and a second notification transmission module 706.

The processing policy initialization module 701 is configured to initialize, in response to receiving a first connection request from a source device, an abnormality processing policy.

The first connection information transmission module 702 is configured to transmit first connection information to a target device of the first connection request.

The first connection confirmation message transmission module 703 is configured to transmit, in response to receiving a first connection information confirmation message transmitted by the target device, a first connection confirmation message to the source device.

The abnormality processing policy generation module 704 is configured to generate the abnormality processing policy based on information of the source device and/or information of the target device.

The first notification transmission module 705 is configured to transmit, in response to receiving a second connection confirmation message indicating that the source device is connected to a first server, a first notification to the target device. The first notification includes the abnormality processing policy.

The second notification transmission module 706 is configured to transmit, in response to receiving a third connection confirmation message indicating that the target device is connected to a first server, a second notification to the source device. The second notification includes the abnormality processing policy.

Further, the connection processing apparatus 700 is further configured to: periodically check a state of the source device and/or a state of the target device; and process, when the state of the source device and/or the state of the target device are abnormal, a device in an abnormal state based on the abnormality processing policy.

Further, the connection processing apparatus 700 is further configured to delete the device in the abnormal state from the abnormality processing policy.

Further, the processing policy initialization module 701 is further configured to: determine a type of a service based on the first connection request; and generate a corresponding abnormality processing policy structure based on the type of the service. The abnormality processing policy structure includes at least a connection identification and a device identification graph. The device identification graph is used to store a device identification and an abnormality processing action.

Further, the abnormality processing policy generation module 704 is further configured to: determine, based on a role of the source device in the service, a first processing action when the source device is abnormal, and save the device identification of the source device and the first processing action in the corresponding abnormality processing policy structure; and/or determine, based on a role of the target device in the service, a second processing action when the target device is abnormal, and save the device identification of the target device and the second processing action in the corresponding abnormality processing policy structure.

Further, the connection processing apparatus 70 is further configured to: start a first timer; in response to receiving state information of the source device and/or the target device prior to expiration of the first timer, reset the first timer; and in response to failing to receive the state information of the source device and/or the target device prior to expiration of the first timer, determine that the state of the source device and/or the state of the target device are abnormal.

Figure 2:
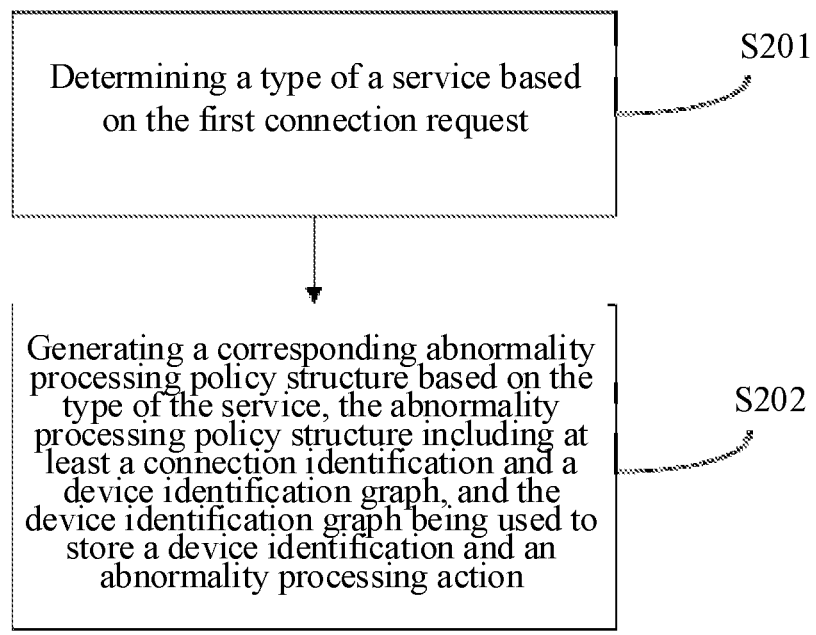
FIG. 2 is a flowchart of initializing an abnormality processing policy in a connection processing method according to an embodiment of the present disclosure.
Figure 3:
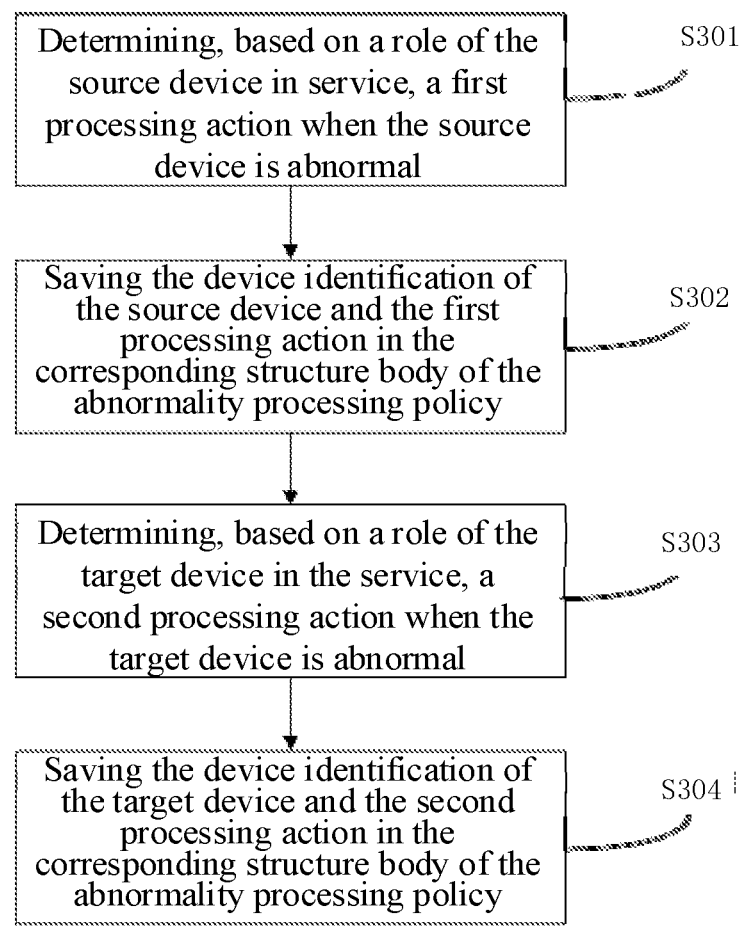
FIG. 3 is a flowchart of generating an abnormality processing policy in a connection processing method according to an embodiment of the present disclosure.

The apparatus shown in FIG. 7 can implement the method according to the embodiments illustrated in FIG. 1 to FIG. 3. The parts of the present embodiment, which are not described in detail, may refer to the related description of the embodiments illustrated in FIG. 1 to FIG. 3. The implementing process and technical effects of the technical solutions can refer to the description of the embodiments illustrated in FIG. 1 to FIG. 3, which are not described in detail again.

Figure 8:
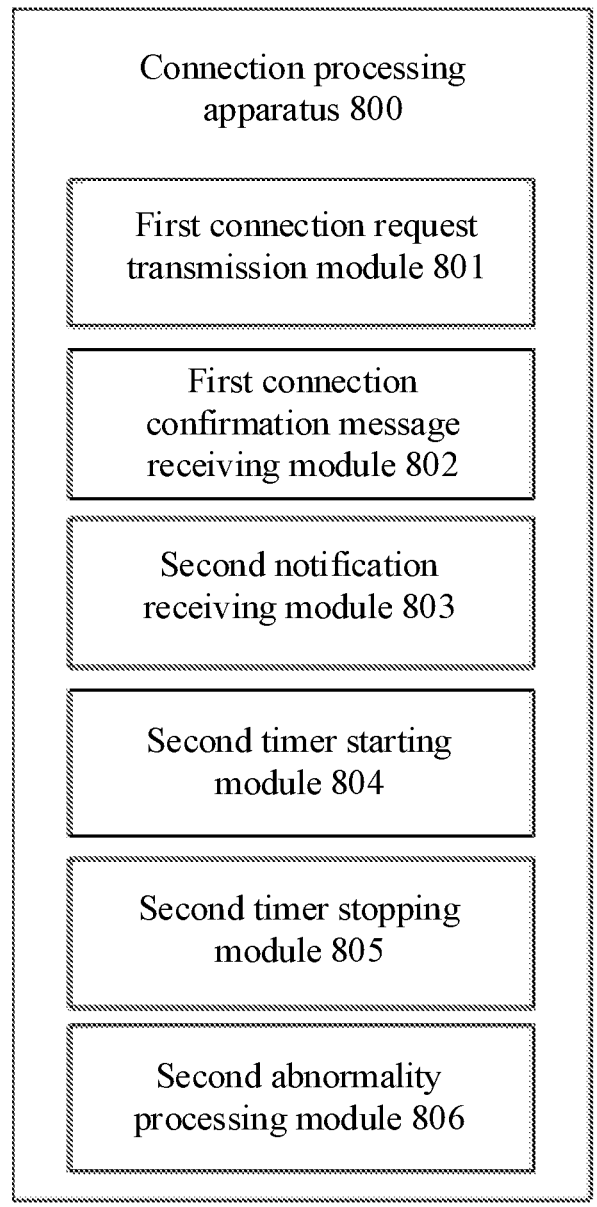
FIG. 8 is a schematic structural diagram of a connection processing apparatus according to another embodiment of the present disclosure.

FIG. 8 is a schematic structural diagram of a connection processing apparatus according to another embodiment of the present disclosure. As illustrated in FIG. 8, the apparatus 800 includes a first connection request transmission module 801, a first connection confirmation message receiving module 802, a second notification receiving module 803, a second timer starting module 804, a second timer stopping module 805, and a second abnormality processing module 806.

The first connection request transmission module 801 is configured to transmit a first connection request to a second server. The first connection request is used to request a target device to connect to a first server.

The first connection confirmation message receiving module 802 is configured to receive a first connection confirmation message transmitted by the second server.

The second notification receiving module 803 is configured to receive a second notification transmitted by the second server. The second notification is used to indicate that the target device is connected to the first server. The second notification includes an abnormality processing policy.

The second timer starting module 804 is configured to start a second timer based on the abnormality processing policy.

The second timer stopping module 805 is configured to, in response to receiving a target device connection message transmitted by the first server prior to expiration of the second timer, stop the second timer.

The second abnormality processing module 806 is configured to, in response to failing to receive the target device connection message transmitted by the first server prior to expiration of the second timer, perform a processing action based on the abnormality processing policy.

Further, the connection processing apparatus 800 is further configured to: transmit a second connection confirmation message to the second server; and transmit a second connection request to the first server.

Further, the connection processing apparatus 800 is further configured to periodically transmit state information of a source device to the second server.

The apparatus shown in FIG. 8 may implement the method according to the embodiment illustrated in FIG. 4. The parts of this embodiment, which are not described in detail, may refer to the related description of the embodiment illustrated in FIG. 4. The implementing process and technical effects of the technical solutions can refer to the description of the embodiment illustrated in FIG. 4, which are not described in detail again.

Figure 9:
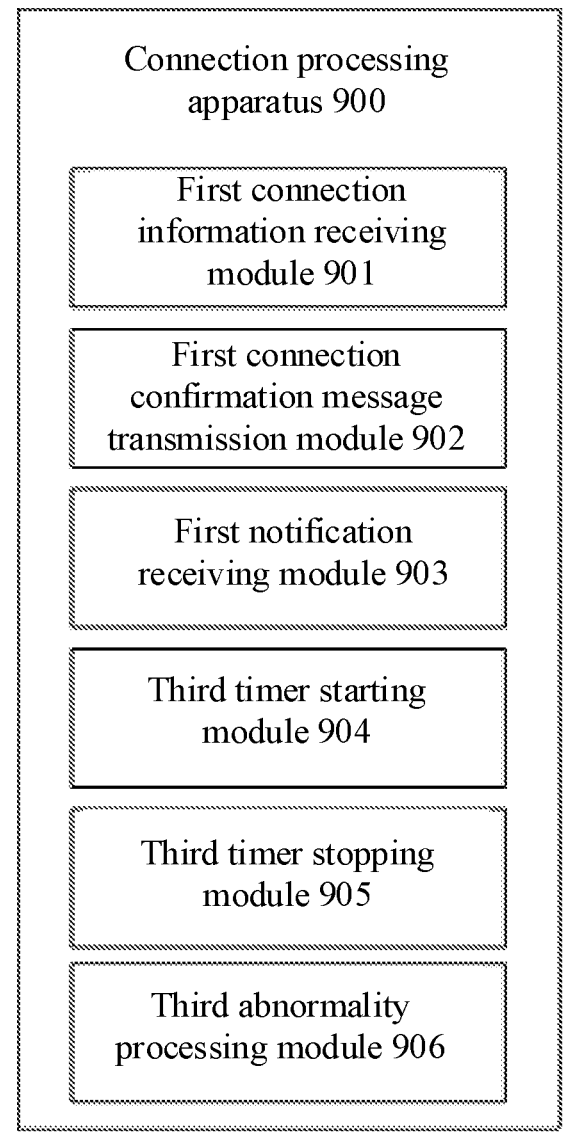
FIG. 9 is a schematic structural diagram of a connection processing apparatus according to yet another embodiment of the present disclosure.

FIG. 9 is a schematic structural diagram of a connection processing apparatus according to yet another embodiment of the present disclosure. As illustrated in FIG. 9, the apparatus 900 includes a first connection information receiving module 901, a first connection confirmation message transmission module 902, a first notification receiving module 903, a third timer starting module 904, a third timer stopping module 905, and a third abnormality processing module 906.

The first connection information receiving module 901 is configured to receive first connection information transmitted by a second server. The first connection information indicates a request from a source device for connecting a target device to a first server.

The first connection confirmation message transmission module 902 is configured to transmit a first connection confirmation message to the second server.

The first notification receiving module 903 is configured to receive a first notification transmitted by the second server. The first notification indicates that the source device is connected to the first server. The first notification includes an abnormality processing policy.

The third timer starting module 904 is configured to start a third timer based on the abnormality processing policy.

The third timer stopping module 905 is configured to, in response to receiving a source device connection message transmitted by the first server prior to expiration of the third timer, stop the third timer.

The third abnormality processing module 906 is configured to, in response to failing to receive the source device connection message transmitted by the first server prior to expiration of the third timer, perform a processing action based on the abnormality processing policy.

Further, the connection processing apparatus 900 is further configured to: transmit a third connection confirmation message to the second server; and transmit a third connection request to the first server.

Further, the connection processing apparatus 900 is further configured to periodically transmit state information of the target device to the second server.

The apparatus shown in FIG. 9 may implement the method of the embodiment illustrated in FIG. 5. The parts of this embodiment, which are not described in detail, may refer to the related description of the embodiment illustrated in FIG. 5. The implementing process and technical effects of the technical solutions can refer to the description in the embodiment illustrated in FIG. 5, which are not described in detail again.

Figure 10:
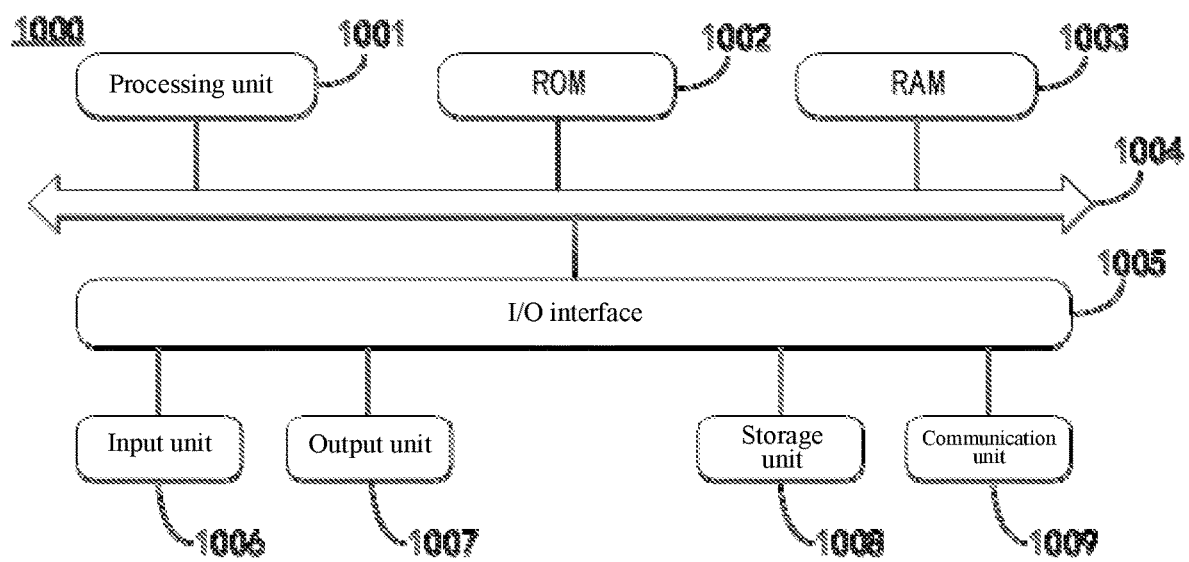
FIG. 10 is a schematic structural diagram of an electronic device according to an embodiment of the present disclosure.

FIG. 10 is a schematic structural diagram of an electronic device 1000 adapted to implement the embodiments of the present disclosure. Referring to FIG. 10, the terminal device according to the embodiment of the present disclosure may include, but are not limited to, a mobile terminal such as a mobile phone, a laptop computer, a digital broadcast receiver, a Personal Digital Assistant (PDA), a tablet computer or PAD, a Portable Multimedia Player (PMP), an on-vehicle terminal (e.g., an on-vehicle navigation terminal), etc., and a fixed terminal such as a digital television (TV), a desktop computer, etc. The electronic device illustrated in FIG. 10 is merely illustrative, and should not be construed as limiting the functions and applications of the embodiments of the present disclosure.

As illustrated in FIG. 10, the electronic device 1000 may include a processing unit 1001, such as a central processing unit, a graphics processing unit, etc., which may perform various appropriate actions and processing in accordance with programs stored in the Read-Only Memory (ROM) 1002 or loaded from a storage unit 1008 into the Random-Access Memory (RAM) 1003. Various programs and data required for operation of the electronic device 1000 may also be stored in the RAM 1003. The processing unit 1001, the ROM 1002, and the RAM 1003 are connected to each other through a bus 1004. An Input/Output (I/O) interface 1005 is also connected to the bus 1004.

Generally, the following units may be connected to the I/O interface 1005: an input unit 1006 including, for example, a touch screen, a touch pad, a keyboard, a mouse, a camera, a microphone, an accelerometer, a gyroscope, etc.; an output unit 1007 including, for example, a Liquid Crystal Display (LCD), a speaker, an oscillator, etc.; the storage unit 1008 including, for example, a magnetic tape or a hard disk; and a communication unit 1009. The communication unit 409 may allow the electronic device 1000 to perform wireless or wired communication with other devices for data exchange. Although FIG. 10 illustrates the electronic device 1000 having various units, it should be appreciated that it is not necessary to implement or provide all the illustrated units. Alternatively, more or fewer units may be implemented or provided.

According to embodiments of the present disclosure, the above processes described with reference to the flowcharts may be implemented as computer software programs. For example, embodiments of the present disclosure include a computer program product, which includes a computer program carried on a non-transitory computer-readable medium. The computer program includes program codes for implementing the method illustrated in the flowcharts. In these embodiments, the computer program may be downloaded and installed from a network through the communication unit 1009, or installed from the storage unit 1008, or installed from the ROM 1002. When the computer program is executed by the processing unit 1001, the above-mentioned functions defined in the methods according to the embodiments of the present disclosure are performed.

It should be noted that the above computer-readable medium in the present disclosure may be a computer-readable signal medium, a computer-readable storage medium, or any combination thereof. For example, the computer-readable storage medium may be, but not limited to, an electrical, magnetic, optical, electromagnetic, infrared, or semiconductor system, apparatus, device, or any combination thereof. More specific examples of the computer-readable storage medium may include, but are not limited to: an electrical connection having one or more wires, a portable computer disk, a hard disk, a Random-Access Memory (RAM), a Read-Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used in combination with an instruction execution system, apparatus, or device. However, in the present disclosure, the computer-readable signal medium may include a data signal propagated in a baseband or as a part of a carrier and carrying computer-readable program codes. Such propagated data signal may be in various forms, including but not limited to an electromagnetic signal, an optical signal, or any suitable combination thereof. The computer-readable signal medium may be any computer-readable medium other than the computer-readable storage medium. The computer-readable signal medium may send, transmit, or transfer programs used by or used in combination with an instruction execution system, apparatus, or device. The program codes included in the computer-readable medium may be transferred via any appropriate medium, including but not limited to, an electric cable, an optical cable, Radio Frequency (RF), or any suitable combination thereof.

In some embodiments, the client and the server may communicate by using any currently known or to-be-developed network protocol, such as HyperText Transfer Protocol (HTTP), and they may be communicated and interconnected with any form or medium of digital data (such as, a communication network). Examples of the communication network include a Local Area Network (LAN), a Wide Area Network (WAN), an internet work (such as, Internet), and an end-to-end network (such as, an ad hoc end-to-end network), as well as any currently known or future developed networks.

The above computer-readable medium may be included in the above electronic device or present independently without being assembled into the electronic device.

The above computer-readable medium may carry one or more programs which, when executed by the electronic device, allow the electronic device to: obtain an input image and a first text; extract features of the input image to obtain a feature vector of the input image; encode the first text to obtain a feature vector of the first text; obtain a joint feature vector based on the feature vector of the input image and the feature vector of the first text; and decode the joint feature vector to generate a second text.

The computer program codes for implementing the operations according to the present disclosure may be written in one or more programming languages or any combination thereof. The programming languages may include, but not limited to, object-oriented programming languages, such as Java, Smalltalk, or C++, as well as conventional procedural programming languages, such as "C" language or similar programming languages. The program codes may be executed completely on a user computer, partly on the user computer, as a standalone software package, partly on the user computer and partly on a remote computer, or completely on a remote computer or a server. In a case where the remote computer is involved, the remote computer may be connected to the user computer through any types of networks, including a Local Area Network (LAN) or a Wide Area Network (WAN), or to an external computer (e.g., over the Internet by using an Internet service provider).

The flowcharts and block diagrams in the accompanying drawings illustrate architectures, functions, and operations of possible implementations of systems, methods, and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It should also be noted that, in some alternative implementations, functions showed in blocks may occur in an order other the order illustrated in the accompanying drawings. For example, actions in two successive blocks may actually be performed substantially in parallel with each other, or sometimes even in a reverse order, depending on functions involved. It should also be noted that each block in the block diagrams and/or flowcharts, or any combination of the blocks in the block diagrams and/or flowcharts, may be implemented by using a dedicated hardware-based system, which is configured to perform specified functions or operations or by using a combination of dedicated hardware and computer instructions.

Modules or units involved and described in the embodiments of the present disclosure can be implemented in software or hardware. Here, a name of a module or a unit does not constitute a limitation on the module or the unit itself under certain circumstances.

The functions described above may be performed, at least in part, by one or more hardware logic components. For example, without limitation, exemplary types of hardware logic components include a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

In the context of this disclosure, the machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of a machine-readable storage medium include an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read Only Memory (CD-ROM), an optical memory device, a magnetic memory device, or any suitable combination thereof.

According to one or more embodiments of the present disclosure, a connection processing method is provided. The connection processing method includes: initializing, in response to receiving a first connection request from a source device, an abnormality processing policy; transmitting first connection information to a target device of the first connection request; transmitting, in response to receiving a first connection information confirmation message transmitted by the target device, a first connection confirmation message to the source device; generating the abnormality processing policy based on information of the source device and/or information of the target device; transmitting, in response to receiving a second connection confirmation message indicating that the source device is connected to a first server, a first notification to the target device, the first notification including the abnormality processing policy; and transmitting, in response to receiving a third connection confirmation message indicating that the target device is connected to a first server, a second notification to the source device, the second notification including the abnormality processing policy.

Further, the method further includes: periodically checking a state of the source device and/or a state of the target device; and processing, when the state of the source device and/or the state of the target device are abnormal, a device in an abnormal state based on the abnormality processing policy.

Further, after said processing the device in the abnormal state based on the abnormality processing policy, the connection processing method further includes: deleting the device in the abnormal state from the abnormality processing policy.

Further, said initializing, in response to receiving the first connection request from the source device, the abnormality processing policy includes: determining a type of a service based on the first connection request; and generating a corresponding abnormality processing policy structure based on the type of the service. The abnormality processing policy structure includes at least a connection identification and a device identification graph. The device identification graph is used to store a device identification and an abnormality processing action.

Further, said generating the abnormality processing policy based on the information of the source device and/or the information of the target device includes: determining, based on a role of the source device in the service, a first processing action when the source device is abnormal, and saving the device identification of the source device and the first processing action in the corresponding abnormality processing policy structure; and/or determining, based on a role of the target device in the service, a second processing action when the target device is abnormal, and saving the device identification of the target device and the second processing action in the corresponding abnormality processing policy structure.

Further, said periodically checking the state of the source device and/or the state of the target device includes: starting a first timer; in response to receiving state information of the source device and/or the target device prior to expiration of the first timer, resetting the first timer; and in response to failing to receive the state information of the source device and/or the target device prior to expiration of the first timer, determining that the state of the source device and/or the state of the target device are abnormal.

According to one or more embodiments of the present disclosure, a connection processing method is provided. The connection processing method includes: transmitting a first connection request to a second server, the first connection request being used to request a target device to connect to a first server; receiving a first connection confirmation message transmitted by the second server; receiving a second notification transmitted by the second server, the second notification being used to indicate that the target device is connected to the first server, the second notification including an abnormality processing policy; starting a second timer based on the abnormality processing policy; in response to receiving a target device connection message transmitted by the first server prior to expiration of the second timer, stopping the second timer; and in response to failing to receive the target device connection message transmitted by the first server prior to expiration of the second timer, performing a processing action based on the abnormality processing policy.

Further, the method further includes: transmitting a second connection confirmation message to the second server; and transmitting a second connection request to the first server.

Further, the method further includes: periodically transmitting state information of a source device to the second server.

According to one or more embodiments of the present disclosure, a connection processing method is provided. The connection processing method includes: receiving first connection information transmitted by a second server, the first connection information indicating a request from a source device for connecting a target device to a first server; transmitting a first connection confirmation message to the second server; receiving a first notification transmitted by the second server, the first notification indicating that the source device is connected to the first server, the first notification including an abnormality processing policy; starting a third timer based on the abnormality processing policy; in response to receiving a source device connection message transmitted by the first server prior to expiration of the third timer, stopping the third timer; and in response to failing to receive the source device connection message transmitted by the first server prior to expiration of the third timer, performing a processing action based on the abnormality processing policy.

Further, the method further includes: transmitting a third connection confirmation message to the second server; and transmitting a third connection request to the first server.

Further, the method further includes: periodically transmitting state information of the target device to the second server.

According to one or more embodiments of the present disclosure, a connection processing apparatus is provided. The connection processing apparatus includes: a processing policy initialization module configured to initialize, in response to receiving a first connection request from a source device, an abnormality processing policy; a first connection information transmission module configured to transmit first connection information to a target device of the first connection request; a first connection confirmation message transmission module configured to transmit, in response to receiving a first connection information confirmation message transmitted by the target device, a first connection confirmation message to the source device; an abnormality processing policy generation module configured to generate the abnormality processing policy based on information of the source device and/or information of the target device; a first notification transmission module configured to transmit, in response to receiving a second connection confirmation message indicating that the source device is connected to a first server, a first notification to the target device, the first notification including the abnormality processing policy; and a second notification transmission module configured to transmit, in response to receiving a third connection confirmation message indicating that the target device is connected to a first server, a second notification to the source device, the second notification including the abnormality processing policy.

Further, the connection processing apparatus is further configured to: periodically check a state of the source device and/or a state of the target device; and process, when the state of the source device and/or the state of the target device are abnormal, a device in an abnormal state based on the abnormality processing policy.

Further, the connection processing apparatus is further configured to delete the device in the abnormal state from the abnormality processing policy.

Further, the processing policy initialization module is further configured to: determine a type of a service based on the first connection request; and generate a corresponding abnormality processing policy structure based on the type of the service. The abnormality processing policy structure includes at least a connection identification and a device identification graph. The device identification graph is used to store a device identification and an abnormality processing action.

Further, the abnormality processing policy generation module is further configured to: determine, based on a role of the source device in the service, a first processing action when the source device is abnormal, and save the device identification of the source device and the first processing action in the corresponding abnormality processing policy structure; and/or determine, based on a role of the target device in the service, a second processing action when the target device is abnormal, and save the device identification of the target device and the second processing action in the corresponding abnormality processing policy structure.

Further, the connection processing apparatus is further configured to: start a first timer; in response to receiving state information of the source device and/or the target device prior to expiration of the first timer, reset the first timer; and in response to failing to receive the state information of the source device and/or the target device prior to expiration of the first timer, determine that the state of the source device and/or the state of the target device are abnormal.

According to one or more embodiments of the present disclosure, a connection processing apparatus is provided. The connection processing apparatus includes: a first connection request transmission module configured to transmit a first connection request to a second server, the first connection request being used to request a target device to connect to a first server; a first connection confirmation message receiving module configured to receive a first connection confirmation message transmitted by the second server; a second notification receiving module configured to receive a second notification transmitted by the second server, the second notification being used to indicate that the target device is connected to the first server, the second notification including an abnormality processing policy; a second timer starting module configured to start a second timer based on the abnormality processing policy; a second timer stopping module configured to, in response to receiving a target device connection message transmitted by the first server prior to expiration of the second timer, stop the second timer; and a second abnormality processing module configured to, in response to failing to receive the target device connection message transmitted by the first server prior to expiration of the second timer, perform a processing action based on the abnormality processing policy.

Further, the connection processing apparatus is further configured to: transmit a second connection confirmation message to the second server; and transmit a second connection request to the first server.

Further, the connection processing apparatus is further configured to periodically transmit state information of a source device to the second server.

According to one or more embodiments of the present disclosure, a connection processing apparatus is provided. The connection processing apparatus includes: a first connection information receiving module configured to receive first connection information transmitted by a second server, the first connection information indicating a request from a source device for connecting a target device to a first server; a first connection confirmation message transmission module configured to transmit a first connection confirmation message to the second server; a first notification receiving module configured to receive a first notification transmitted by the second server, the first notification indicating that the source device is connected to the first server, the first notification including an abnormality processing policy; a third timer starting module configured to start a third timer based on the abnormality processing policy; a third timer stopping module configured to, in response to receiving a source device connection message transmitted by the first server prior to expiration of the third timer, stop the third timer; and a third abnormality processing module configured to, in response to failing to receive the source device connection message transmitted by the first server prior to expiration of the third timer, perform a processing action based on the abnormality processing policy.

Further, the connection processing apparatus is further configured to: transmit a third connection confirmation message to the second server; and transmit a third connection request to the first server.

Further, the connection processing apparatus is further configured to periodically transmit state information of the target device to the second server.

According to one or more embodiments of the present disclosure, an electronic device is provided. The electronic device includes at least one processor, and a memory communicatively connected to the at least one processor. The memory has instructions stored thereon and executable by the at least one processor. The instructions, when executed by the at least one processor, cause the at least one processor to implement any one of the connection processing methods as described above.

According to one or more embodiments of the present disclosure, a non-transitory computer-readable storage medium is provided. The non-transitory computer-readable storage medium stores computer instructions. The computer instructions are configured to cause the computer to implement any one of the connection processing methods as described above.

The above description is merely intended to explain the preferred embodiments of the present disclosure and the employed principles of technology. It will be appreciated by those skilled in the art that the scope of the present disclosure herein is not limited to the technical solutions formed by the specific combinations of the above technical features, and the scope of the present disclosure should also encompass other technical solutions formed by any other combinations of features described above or equivalents thereof without departing from the above ideas of the present disclosure. For example, the above features and the technical features disclosed in the present disclosure having similar functions (but not limited to these features) are replaced with each other to form the technical solution.

What is claimed is:

1. A connection processing method, comprising:
   initializing, in response to receiving a first connection request from a first device, an abnormality processing policy;
   transmitting first connection information to a second device of the first connection request;
   transmitting, in response to receiving a first connection information confirmation message transmitted by the second device, a first connection confirmation message to the source device the first device;

generating the abnormality processing policy based on information of the first device and/or information of the second device;

transmitting, in response to receiving a second connection confirmation message indicating that the first device is connected to a first server, a first notification to the target device the second device, the first notification comprising the abnormality processing policy; and transmitting, in response to receiving a third connection confirmation message indicating that the second device is connected to a first server, a second notification to the first device, the second notification comprising the abnormality processing policy.

2. The connection processing method according to claim 1, further comprising:

periodically checking a state of the first device and/or a state of the second device; and processing, when the state of the first device and/or the state of the second device are abnormal, a device in an abnormal state based on the abnormality processing policy.

3. The connection processing method according to claim 2, further comprising, after said processing the device in the abnormal state based on the abnormality processing policy:

deleting the device in the abnormal state from the abnormality processing policy.

4. The connection processing method according to claim 1, wherein said initializing, in response to receiving the first connection request from the first device, the abnormality processing policy comprises:

determining a type of a service based on the first connection request; and generating a corresponding abnormality processing policy structure based on the type of the service, wherein the abnormality processing policy structure comprises at least a connection identification and a device identification graph, and wherein the device identification graph is used to store a device identification and an abnormality processing action.

5. The connection processing method according to claim 4, wherein said generating the abnormality processing policy based on the information of the first device and/or the information of the second device comprises:

determining, based on a role of the first device in the service, a first processing action when the first device is abnormal, and saving the device identification of the first device and the first processing action in the corresponding abnormality processing policy structure; and/or determining, based on a role of the second device in the service, a second processing action when the second device is abnormal, and saving the device identification of the second device and the second processing action in the corresponding abnormality processing policy structure.

6. The connection processing method according to claim 2, wherein said periodically checking the state of the first device and/or the state of the second device comprises:

starting a first timer;

in response to receiving state information of the first device and/or the second device prior to expiration of the first timer, resetting the first timer; and in response to failing to receive the state information of the first device and/or the second device prior to expiration of the first timer, determining that the state of the first device and/or the state of the second device are abnormal.

7. A connection processing method, applied in a first device, comprising:

transmitting a first connection request to a second server, the first connection request being used to request a second device to connect to a first server;

receiving a first connection confirmation message transmitted by the second server;

receiving a second notification transmitted by the second server, the second notification being used to indicate that the second device is connected to the first server, wherein the second notification comprises an abnormality processing policy;

starting a second timer based on the abnormality processing policy;

in response to receiving a second device connection message transmitted by the first server prior to expiration of the second timer, stopping the second timer; and in response to failing to receive the second device connection message transmitted by the first server prior to expiration of the second timer, performing a processing action based on the abnormality processing policy.

8. The connection processing method according to claim 7, further comprising:

transmitting a second connection confirmation message to the second server; and transmitting a second connection request to the first server.

9. The connection processing method according to claim 7, further comprising:

periodically transmitting state information of the first device to the second server.

10. A connection processing method, applied in a second device, comprising:

receiving first connection information transmitted by a second server, the first connection information indicating a request from a first device for connecting the second device to a first server;

transmitting a first connection confirmation message to the second server;

receiving a first notification transmitted by the second server, the first notification indicating that the first device is connected to the first server, wherein the first notification comprises an abnormality processing policy;

starting a third timer based on the abnormality processing policy;

in response to receiving a first device connection message transmitted by the first server prior to expiration of the third timer, stopping the third timer; and in response to failing to receive the first device connection message transmitted by the first server prior to expiration of the third timer, performing a processing action based on the abnormality processing policy.

11. The connection processing method according to claim 10, further comprising:

transmitting a third connection confirmation message to the second server; and transmitting a third connection request to the first server.

12. The connection processing method according to claim 10, further comprising:

periodically transmitting state information of the second device to the second server.

13. An electronic device, comprising:
a memory configured to store a computer-readable instruction; and
a processor configured to run the computer-readable instruction to cause the processor when running the computer-readable instruction, to implement the method according to claim 10.

14. A non-transitory computer-readable storage medium configured to store a computer-readable instruction, wherein the computer-readable instruction, when executed by a computer, causes the computer to implement the method according to claim 10.

15. An electronic device, comprising:
a memory configured to store a computer-readable instruction; and
a processor configured to run the computer-readable instruction to cause the processor when running the computer-readable instruction, to implement the method according to claim 1.

16. The electronic device according to claim 15, wherein the method further comprises:
periodically checking a state of the first device and/or a state of the second device; and
processing, when the state of the first device and/or the state of the second device are abnormal, a device in an abnormal state based on the abnormality processing policy.

17. The electronic device according to claim 15, wherein the method further comprises, after said processing the device in the abnormal state based on the abnormality processing policy:
deleting the device in the abnormal state from the abnormality processing policy.

18. A non-transitory computer-readable storage medium configured to store a computer-readable instruction, wherein the computer-readable instruction, when executed by a computer, causes the computer to implement the method according to claim 1.

19. An electronic device, comprising:
a memory configured to store a computer-readable instruction; and
a processor configured to run the computer-readable instruction to cause the processor when running the computer-readable instruction, to implement the method according to claim 7.

20. A non-transitory computer-readable storage medium configured to store a computer-readable instruction, wherein the computer-readable instruction, when executed by a computer, causes the computer to implement the method according to claim 7.

* * * * *